No. 842,314.

PATENTED JAN. 29, 1907.

G. HEELEY & C. FÉRY.
PYROMETER.
APPLICATION FILED NOV. 11, 1905.

Witnesses:

Inventors
George Heeley
Charles Féry
By Wm E Boulter
Attorney

UNITED STATES PATENT OFFICE.

GEORGE HEELEY AND CHARLES FÉRY, OF PARIS, FRANCE; SAID HEELEY ASSIGNOR TO LA COMPAGNIE POUR LA FABRICATION DES COMPTEURS ET MATERIEL D' USINES À GAZ, OF PARIS, FRANCE.

PYROMETER.

No. 842,314.      Specification of Letters Patent.      Patented Jan. 29, 1907.

Application filed November 11, 1905. Serial No. 286,923.

*To all whom it may concern:*

Be it known that we, GEORGE HEELEY and CHARLES FÉRY, citizens of the French Republic, and residents of Paris, in France, have invented certain new and useful Improvements in Pyrometers, of which the following is a specification.

This invention relates to a pyrometric telescope with a diaphragm intended for use in the measurement of the very highest known temperatures.

Figure 1:
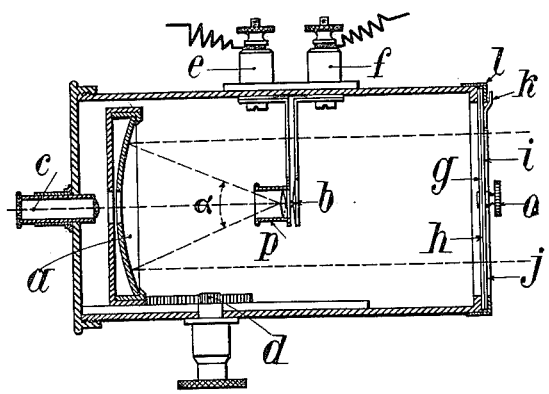
Figure 2:
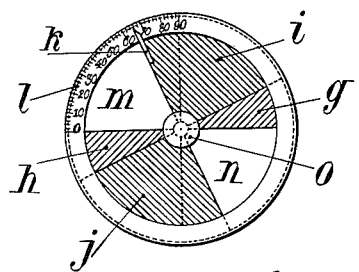

In the accompanying drawings, Figure 1 is a longitudinal section of a pyrometric telescope provided with the diaphragm device according to this invention, Fig. 2 being a front elevation of the diaphragm itself.

The telescope is constituted by a cylindrical body in which is adjustably mounted a mirror $a$, secured to a toothed rack operated by a pinion $d$. At $b$ is the soldered joint of a thermo-electric pile constituted by two wires, one of copper and the other of "constantan," which is a well-known alloy of copper and nickel in equal parts. The wires are soldered crosswise in the center and connected at the ends to two rods or plates electrically communicating with two terminals $e$ and $f$, which are electrically insulated from each other. At the end of a fixed cylinder $p$, near the soldered joint $b$, is arranged another small mirror. Heat and luminous rays entering the apparatus are reflected by the mirror $a$ onto the mirror arranged at $b$, which sends the rays back into the eyepiece $c$, through which the hot body is viewed.

The eyepiece $c$ serves for focusing the hot body or mass the temperature of which is to be measured. This is done by varying the position of the mirror $a$ by means of the pinion $d$. When the apparatus is properly arranged, the heat-rays are concentrated at the conjugate focus of the point looked at, the said focus being at that moment at $b$. If, for instance, the temperature of the sun is to be measured, the sun is looked at through the eyepiece $c$. A calorific and luminous image of the sun is obtained at the conjugate focus of the sun relatively to the mirror. The conjugate focus and consequently the image move with the mirror of the telescope when the pinion $d$ is rotated.

The image of the sun is brought on the joint of the elements by turning the pinion $d$. To that end the eyepiece $c$ is so arranged that it is always directed on the fixed joint $b$ and the small mirror surrounding the joint and reflecting into the eyepiece $c$ the rays already reflected by the mirror $a$. When the image of the sun is clearly visible in the eyepiece $c$, it is obvious that this image is formed in the mirror surrounding the joint $b$, and consequently on the joint itself. It is a well-known optical method for adjusting a telescope. The thermo-electric element being heated by the solar rays, its temperature rises. According to a well-known physical law a difference of potential $\triangle$ is produced in the element and is in proportion to the difference of temperatures $t - t'$ of the hot and cold part of the element.

$$\triangle = K.\ (t - t'.)$$

This difference of temperature is obviously in proportion to the quantity of heat $q$ received by the element.

$$t - t' = K' - q.$$

This quantity $q$ is in proportion to the quantity of heat $q'$ of the image.

$$q = K'' - q'.$$

This quantity $q'$ is in proportion to the quantity of heat $Q$ emitted by the sun.

$$q = K''' \times Q.$$

The quantity of Q as given by the law of Stefan, Viennese physicist, (*Wiener Akademie*, Berlin, Anno. 1879, t. LXXIX, pages 391-428,) is as follows: 'The quantity of heat radiated by a furnace or a black body on another black body is in proportion to the difference of the fourth powers of the absolute temperatures of the two bodies. If T is the absolute temperature of the furnace and $t$ the absolute temperature of the soldered joint and Q the quantity of heat radiated by the furnace, the above law will be analytically expressed by the formula $$Q = A\ (T^4 - t^4).$$

The soldered joint can be considered as a black body. It is, in fact, covered with a varnish containing lampblack.

From the above equations the following will be obtained:

$$\triangle = K.K'.K''.K'''.A\,(T^4 - t^4)$$

or $$\triangle = \text{Constant} \times (T^4 - t^4);$$

but the number $t^4$ being negligible as compared with $T^4$, we may write $\triangle = C\,T^4$.

The difference of potential $\triangle$ is indicated by any needle galvanometer. The galvanometer is graduated by taking as well-known temperatures the melting temperatures of silver, 962° centigrade, and of gold, 1060° centigrade. The scale of the galvanometer is divided into centigrade degrees by applying the law of fourth powers.

The interposition of a mirror as the apparatus for concentrating the heat of the furnace on the soldered joint is indispensable in order to increase the quantity of heat to be measured.

In this apparatus the measurements are independent of the distance of the telescope from the furnace. In fact, when this distance varies it is necessary to vary the distance of the mirror $a$ from the joint $b$ in order to focus the hot body to be measured; but on this movement the angle $\alpha$ of the heat-cone which enters the fixed cylinder $p$ in the joint $b$ is obviously constant. The angle $\alpha$ is independent of the distance of the telescope from the furnace.

In order to measure the temperature in the interior of a furnace, the apparatus is placed at four or five meters distance from the furnace and pointed at an opening in the walls of the furnace. The telescope is provided with a radial diaphragm, as shown in Fig. 2. The diaphragm is constituted by two fixed sectors $g$ and $h$ and two adjustable sectors $i$ and $j$, which rotate together about a central pin $o$. These adjustable sectors $i$ and $j$ carry an indicator $k$, moving on the circular graduation $l$, which enables the angles of active sectors $n$ and $m$ to be measured, the said angles varying from "0" to ninety degrees. The above diaphragm device has been adopted in order to enable the highest temperature known to be measured with the same apparatus. When the apparatus is pointed at a furnace with a very high temperature, the quantity of heat falling on the soldered joint is reduced by means of the diaphragm by reducing the free opening of the diaphragm, for it is necessary not to heat the joint of the thermo-electric element to a temperature above the melting temperature of the tin used for soldering the copper wire to the other wire. When pointed at the sun, for instance, the element would be melted. The telescope being pointed with full opening—that is to say, with the open parts $m$ and $n$ forming an angle of ninety degrees—to a furnace where there is silver at its melting-point of 962°, the same deviation at the galvanometer will be obtained by pointing the apparatus to a furnace containing platinum for such an angle $x$ as to give $$90°\,(2.32 - t^4) = x\,(17.9 - t^4),$$

2.32 and 17.9 being, respectively, the fourth powers of absolute melting temperatures of these two metals expressed in thousands of degrees and $t^4$ being the fourth power of the temperature of the soldered joint—that is to say, 0.0086, which is negligible. In this way we shall have, therefore, $$x = \frac{90 \times 2.32}{17.9} = \frac{208.8}{17.9} = 11.6°$$

that is, the angle which the needle $k$ must show on the graduations $l$ in order to have the same deviation at the galvanometer in both cases. It must be pointed out finally that this method of reducing the sensitiveness is the only one that it is possible to use, for the introduction of a resistance into the circuit of the galvanometer would reduce, it is true, the sensitiveness, but would not prevent the increasing heating of the soldered joint, which could go as far as the melting-point. In fact, if an elevation of temperature of 40° is admitted for the joint pointed to molten silver it will be seen that by pointing the same joint to molten platinum we will obtain $$\frac{40 \times 17.9}{2.32} = \frac{716}{2.32} = 308.6°\,C.,$$

which is an excessive temperature capable of injuring the element and for which the proportionality of indications will no longer subsist.

What we claim as our invention, and desire to secure by Letters Patent, is—

1. The combination with a casing, of an eyepiece arranged at one end of the casing, a mirror within the casing, a second mirror within the casing adapted to receive reflected rays from the first mirror and reflect said rays into the eyepiece, a thermo-electric pile the soldered joint of which is within the casing close to the said second mirror, and an adjustable diaphragm arranged at the other end of the casing.

2. The combination with a casing, of an eyepiece arranged at one end of the casing, a mirror adjustably arranged within the casing, a second mirror within the casing adapted to receive reflected rays from the first mirror and reflect said rays into the eyepiece, a thermo-electric pile the soldered joint of which is within the casing close to the said second mirror, and an adjustable diaphragm arranged at the other end of the casing.

3. The combination with a casing, of an eyepiece arranged at one end of the casing, a mirror within the casing, a second mirror within the casing adapted to receive reflected rays from the first mirror and reflect said rays into the eyepiece, a thermo-electric pile the soldered joint of which is within the casing close to the said second mirror, and an adjustable diaphragm arranged at the other end of the casing, said diaphragm comprising fixed and rotatable sectors arranged relatively to each other as described, and an indicator-scale.

4. The combination with a casing, of an eyepiece arranged at one end of the casing, an adjustable mirror within the casing, a second mirror within the casing adapted to receive reflected rays from the first mirror and reflect said rays into the eyepiece, a thermo-electric pile the soldered joint of which is within the casing close to the said second mirror, and an adjustable diaphragm arranged at the other end of the casing.

5. A pyrometric telescope comprising a casing, an eyepiece $c$, a thermo-electric pile $b$, a mirror-cylinder $p$, an adjustable mirror $a$, and an adjustable diaphragm $g\ h\ i\ j$, substantially as set forth.

In testimony whereof we have signed our names to this specification in the presence of two subscribing witnesses.

GEORGE HEELEY.
CHARLES FÉRY.

Witnesses:
 GEORGES BONNEUIL,
 T. W. CAULDWELL.